United States Patent
Richter et al.

(10) Patent No.: US 8,017,691 B2
(45) Date of Patent: Sep. 13, 2011

(54) POLYARYLENE ETHER KETONE MOULDING COMPOSITION HAVING GOOD NOTCHED IMPACT RESISTANCE

(75) Inventors: Alexander Richter, Oer-Erkenschwick (DE); Hans-Guenter Lohkaemper, Haltern am See (DE)

(73) Assignee: Evonik Degussa GmbH, Essen (DE)

( * ) Notice: Subject to any disclaimer, the term of this patent is extended or adjusted under 35 U.S.C. 154(b) by 276 days.

(21) Appl. No.: 12/466,425

(22) Filed: May 15, 2009

(65) Prior Publication Data

US 2009/0292073 A1 Nov. 26, 2009

(51) Int. Cl.
- *C08K 5/07* (2006.01)
- *C08G 73/02* (2006.01)
- *C08C 19/20* (2006.01)
- *C08C 19/22* (2006.01)

(52) U.S. Cl. ......... 525/153; 525/385; 525/343; 525/374

(58) Field of Classification Search ............... 525/153, 525/385, 343, 374
See application file for complete search history.

(56) References Cited

U.S. PATENT DOCUMENTS

| 4,656,220 A * | 4/1987 | Jadamus et al. ............... 524/502 |
| 4,728,693 A | 3/1988 | Dröscher et al. |
| 5,208,278 A | 5/1993 | Koch et al. |
| 2006/0134419 A1 | 6/2006 | Monsheimer et al. |
| 2007/0265414 A1 | 11/2007 | Richter et al. |
| 2007/0265415 A1 | 11/2007 | Richter et al. |
| 2008/0085990 A1 | 4/2008 | Richter et al. |

FOREIGN PATENT DOCUMENTS

| EP | 0 356 948 A2 | | 3/1990 |
| EP | 0 451 458 | * | 2/1991 |
| EP | 0 451 458 A1 | | 10/1991 |
| EP | 0 451 556 A2 | | 10/1991 |
| WO | WO 2007/107519 | * | 9/2007 |
| WO | WO 2007/107519 A1 | | 9/2007 |

OTHER PUBLICATIONS

U.S. Appl. No. 11/722,261, filed Jun. 20, 2007, Richter, et al.

* cited by examiner

*Primary Examiner* — William K Cheung
(74) *Attorney, Agent, or Firm* — Oblon, Spivak, McClelland, Maier & Neustadt, L.L.P.

(57) ABSTRACT

A molding composition with high notched impact resistance contains the following components: a) from 75 to 99.9 parts by weight of polyarylene ether ketone, and b) from 0.1 to 25 parts by weight of polyalkenylene having from 5 to 12 carbon atoms in the repeat unit, the total of these parts by weight being 100.

20 Claims, No Drawings

POLYARYLENE ETHER KETONE MOULDING COMPOSITION HAVING GOOD NOTCHED IMPACT RESISTANCE

BACKGROUND OF THE INVENTION

1. Field of the Invention

The invention relates to a moulding composition based on a polyarylene ether ketone (PAEK) with improved notched impact resistance.

2. Discussion of the Background

Semicrystalline polyarylene ether ketones generally feature a high melting point and a high glass transition temperature. They moreover have high mechanical strength, high impact resistance, and also high resistance to a very wide variety of solvents.

However, the comparatively low notched impact resistance of polyarylene ether ketones is disadvantageous for some applications. Surface damage or a disadvantageous shape of a component resulting from its design can serve to initiate a crack or a fracture in certain applications or components.

DETAILED DESCRIPTION OF THE INVENTION

An object of the present invention was to provide a PAEK moulding composition with improved notched impact resistance.

This and other objects were achieved through a moulding composition which comprises the following components:

a) from 75 to 99.9 parts by weight, preferably from 80 to 99 parts by weight and particularly preferably from 85 to 98 parts by weight, of polyarylene ether ketone, and b) from 0.1 to 25 parts by weight, preferably from 1 to 20 parts by weight and particularly preferably from 2 to 15 parts by weight, of polyalkenylene having from 5 to 12 carbon atoms in the repeat unit, wherein the total of the parts by weight of a) and b) is 100.

The moulding composition preferably comprises from 30 to 100% by weight of components a) and b) together, particularly preferably from 40 to 98% by weight, and with particular preference from 50 to 95% by weight and with very particular preference from 60 to 90% by weight. The remainder is provided by conventional auxiliaries and additives, and also other polymers.

The PAEK contains units of the following formulae (—Ar—X—) and (—Ar'—Y—), where Ar and Ar' are a divalent aromatic radical, preferably 1,4-phenylene, 4,4'-biphenylene, or else 1,4-, 1,5- or 2,6-naphthylene. X is an electron-withdrawing group, preferably carbonyl or sulphonyl, while Y is another group, such as O, S, $CH_2$, isopropylidene or the like. At least 50% of the group, X here should be a carbonyl group, preferably at least 70% and particularly preferably at least 80%, while at least 50% of the groups Y should be composed of oxygen, preferably at least 70% and particularly preferably at least 80%.

In the particularly preferred embodiment, 100% of the groups X comprise carbonyl groups and 100% of the groups Y comprise oxygen. In this embodiment, the PAEK can by way of example be a polyether ether ketone (PEEK; Formula I), a polyether ketone (PEK; Formula II), a polyether ketone ketone (PEKK; Formula III) or a polyether ether ketone ketone (PEEKK; Formula IV), but other arrangements of the carbonyl groups and oxygen groups are naturally also possible.

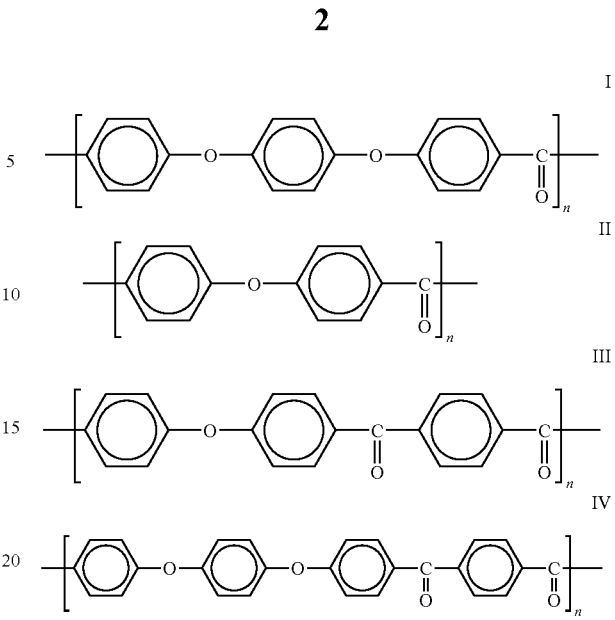

The PAEK is generally semicrystalline, and this is by way of example visible in DSC analysis, where a crystallite melting point $T_m$ is found, its order of magnitude in most instances being around 300° C. or above. However, the invention is also applicable to amorphous PAEK. A general rule is that sulphonyl groups, biphenylene groups, naphthylene groups or bulky groups Y, such as an isopropylidene group, reduce crystallinity.

In one preferred embodiment, the viscosity number measured to DIN EN ISO 307 on a solution of 250 mg of PAEK in 50 ml of 96 per cent strength by weight $H_2SO_4$ at 25° C. is from about 20 to 150 $cm^3/g$ and preferably from 50 to 120 $cm^3/g$.

The PAEK can be produced by what is known as the nucleophilic route by polycondensation of bisphenols and of organic dihalogen compounds and/or of halophenols in a suitable solvent in the presence of an auxiliary base; the process is described by way of example in EP A 0 001 879, EP-A-0 182 648 and EP A-0 244 167. However, the PAEK can also be produced by what is known as the electrophilic route in a strongly acidic or, respectively, Lewis-acidic medium; this process is described by way of example in EP-A-1 170 318 and in the literature cited therein.

The polyalkenylene comprises repeat units of the following formula

—[CH=CH—$(CH_2)_n$]— wherein n=from 3 to 10. It is mostly produced via ring-opening polymerization of cycloolefins in the presence of a metathesis catalyst. The degree of polymerization is generally from 6 to 2000, preferably from 15 to 1500 and particularly preferably from 25 to 1200. Examples of suitable polymers are polypentenylene, polyhexenylene, polyheptenylene, polyoctenylene, polynonenylene, polydecenylene, poly(3-methyloctenylene), poly(3-methyldecenylene), polyundecenylene or polydodecenylene. Polyalkenylenes are sometimes also termed polyalkenamers, and the polymers belonging to this group are sometimes also called polypentenamer, polyhexenamer, polyheptenamer, polyoctenamer etc.

The production of polypentenylene is described by way of example in U.S. Pat. No. 3,607,853. Polyhexenylene is produced by alternating copolymerization of butadiene and ethene. Polyheptenylene is produced by metathesis of cycloheptene (e.g. U.S. Pat. No. 4,334,048) and polyoctenylene is produced by metathesis of cyclooctene (A. Dräxler, Kautschuk+Gummi, Kunststoff 1981, pages 185 to 190). The higher polyalkenylenes are produced correspondingly. For the purposes of the invention, mixed polyalkenylenes, i.e. copolymers (U.S. Pat. No. 3,974,092; U.S. Pat. No. 3,974,094) or a mixture of various polyalkenylenes can also be used.

Examples of conventional auxiliaries and additives which can be present in the moulding composition are processing aids, stabilizers, pigments, fillers, nanofillers, fibrous reinforcing materials or conductive additives, such as carbon black or carbon nanotubes (CNT). Examples of other polymers which can be a constituent of the moulding composition are fluoropolymers, such as polytetrafluoroethylene, polysulphone, polyether sulphone, polyphenylene sulphone, polybenzimidazole, polyphenylene sulphide, semiaromatic polyamides (PPA), liquid-crystalline polymers (LCP), polyimide or polyetherimide.

The moulding composition is produced in the melt by mixing the individual components.

Using the moulding composition of the invention, mouldings are produced with the aid of the shaping processes familiar for PAEK, examples being injection moulding, extrusion or hot compression moulding. These mouldings are composed either entirely or to some extent of the moulding composition of the invention. In the latter case, they are composite parts which comprise, alongside the component composed of the moulding composition of the invention, at least one further component which by way of example is composed of another plastics moulding composition, of ceramic or of metal. The production of multicomponent mouldings is background art; by way of example, mention may be made of multilayer pipes, multilayer films, and also composite parts produced by in-mould coating or by overmoulding.

Having generally described this invention, a further understanding can be obtained by reference to certain specific examples which are provided herein for purposes of illustration only, and are not intended to be limiting unless otherwise specified.

EXAMPLES

In the examples, VESTAKEEP® 4000G, a PEEK from Evonik Degussa GmbH, was compounded in a Coperion Werner & Pfleiderer ZSK25 WLE together with a polyoctenylene (VESTENAMER® 8012, Evonik Degussa GmbH). The two materials were fed in the form of a mixture of pellets into the first intake and were remelted with throughput 10 kg/h, using a screw rotation rate of 140 revolutions per minute and a barrel temperature of 370° C. Vacuum devolatilization at a level of from 100 to 200 mbar was used. The homogeneous melt cooled after discharge from the die and was comminuted to give pellets. Three different compounded materials were thus produced:

Example 1

95% by weight of PEEK; 5% by weight of polyoctenylene

Example 2

90% by weight of PEEK; 10% by weight of polyoctenylene

Example 3

85% by weight of PEEK; 15% by weight of polyoctenylene

Pure VESTAKEEP® 4000G served as reference.

The pelletized compounded materials, and also the reference material, were processed in an Arburg injection-moulding machine at a melt temperature of 380° C. and a mould temperature of 180° C. to give test specimens. The results on mechanical and thermal testing are collected in Table 1.

TABLE 1

Results of testing

| Properties | | Test standard | Unit | Reference | Example 1 | Example 2 | Example 3 |
|---|---|---|---|---|---|---|---|
| Volume flow rate (MVR) | 400° C./5 kg | ISO 1133 | cm$^3$/10 min | 14.5 | 9.6 | 9.5 | 4.7 |
| Tensile test | 50 mm/min | ISO 527-1/2 | | | | | |
| Yield stress | | | MPa | 96 | 80 | 71 | — |
| Tensile strain at yield | | | % | 5 | 5.1 | 7 | — |
| Tensile strain at break | | | % | 30 | 78 | 96 | 93 |
| Tensile modulus | | | MPa | 3500 | 3080 | 2750 | 2320 |
| CHARPY impact resistance | 23° C. | ISO 179/1eU | kJ/m$^2$ | N | N | N | N |
| | −30° C. | | kJ/m$^2$ | N | N | N | N |
| CHARPY notched impact | 23° C. | ISO 179/1eA | kJ/m$^2$ | 7 C | 24 C | 35 C | 30 H |
| resistance | −30° C. | | kJ/m$^2$ | 6 C | 17 C | 18 C | 17 C |
| Heat distortion temperature | method A | DIN EN ISO 75 | ° C. | 155 | 154 | 152 | 150 |
| | method B | | ° C. | 205 | 196 | 173 | 174 |
| Vicat softening point | method A50 | DIN EN ISO 306 | ° C. | 335 | 336 | 336 | 337 |
| | method B50 | | ° C. | 305 | 280 | 266 | 252 |

N = no fracture/
C = complete fracture/
H = hinge fracture

The data show that according to the invention the notched impact resistance can be markedly improved even at low content of polyoctenylene. The changes in the other properties are in agreement with the changes expected when using rubber modification. It is surprising that despite the limit stated in the VESTENAMER® product brochure for thermal stability (275° C. on TGA testing), which is indeed plausible for this type of aliphatic compound, the effect of an impact-modifying rubber is achieved even at the considerably higher temperatures required for compounding with a PAEK (here 370° C.). This is even more surprising since the properties of the polyalkenylene used (crystallinity at room temperature; low melt viscosity) do not give any indication of rubber-like behavior.

German patent application 10 2008 001 873.2 filed May 20, 2008, is incorporated herein by reference.

Numerous modifications and variations on the present invention are possible in light of the above teachings. It is therefore to be understood that within the scope of the appended claims, the invention may be practiced otherwise than as specifically described herein.

The invention claimed is:

1. A moulding composition, comprising:
   a) from 75 to 99.9 parts by weight of polyarylene ether ketone; and
   b) from 0.1 to 25 parts by weight of polyalkenylene having from 5 to 12 carbon atoms in a repeat unit,
   wherein a total sum of the parts by weight of a) and b) is 100.

2. The moulding composition according to claim 1, wherein a sum of components a) and b) is at least 30% by weight, based on the weight of the moulding composition.

3. The moulding composition according to claim 1, wherein the polyarylene ether ketone is a polyether ether ketone (PEEK), a polyyether ketone (PEK), a polyether ketone ketone (PEKK), a polyether ether ketone ketone (PEEKK) or mixtures thereof.

4. A moulding, obtained from the moulding composition according to claim 1.

5. The moulding according to claim 4, which consists of the moulding composition according to claim 1.

6. The moulding according to claim 4, which is a composite part.

7. The moulding composition according to claim 1, comprising from 80 to 99 parts by weight of a), and from 1 to 20 parts by weight of b).

8. The moulding composition according to claim 1, comprising from 85 to 98 parts by weight of a), and from 2 to 15 parts by weight of b).

9. The moulding composition according to claim 1, comprising from 30 to 100% by weight of components a) and b) based on the weight of the moulding composition.

10. The moulding composition according to claim 1, comprising from 40 to 98% by weight of components a) and b) based on the weight of the moulding composition.

11. The moulding composition according to claim 1, comprising from 50 to 95% by weight of components a) and b) based on the weight of the moulding composition.

12. The moulding composition according to claim 1, wherein said polyarylene ether ketone comprises at least one unit of the following formulae (—Ar—X—) and/or (—Ar'—Y—), wherein Ar and Ar' independently are a divalent aromatic radical, X is an electron-withdrawing group, and Y is a group different from X.

13. The moulding composition according to claim 1, wherein said polyarylene ether ketone comprises at least one unit of the following formulae (—Ar—X—) and/or (—Ar'—Y—), wherein Ar and Ar' independently are 1,4-phenylene, 4,4'-biphenylene, 1,4-naphthylene, 1,5-naphthylene or 2,6-naphthylene,
X is carbonyl or sulphonyl, and
Y is O, S, $CH_2$, or isopropylidene.

14. The moulding composition according to claim 12, wherein at least 50% of the groups X are a carbonyl group, and at least 50% of the groups Y are oxygen.

15. The moulding composition according to claim 12, wherein 100% of the groups X are carbonyl groups, and 100% of the groups Y are oxygen.

16. The moulding composition according to claim 1, wherein the polyalkenylene comprises a repeat unit of the following formula

[CH=CH—$(CH_2)_n$]— wherein n=from 3 to 10.

17. The moulding composition according to claim 1, wherein a degree of polymerization of the polyalkenylene is from 6 to 2000.

18. The moulding composition according to claim 12, wherein the polyalkenylene is polypentenylene, polyhexenylene, polyheptenylene, polyoctenylene, polynonenylene, polydecenylene, poly(3-methyloctenylene), poly(3-methyldecenylene), polyundecenylene, polydodecenylene or mixtures thereof.

19. The moulding composition according to claim 1, wherein the polyalkenylene is a polyalkenamer selected from the group consisting: of polypentenamer, polyhexenamer, polyheptenamer, polyoctenamer and mixtures thereof.

20. The moulding composition according to claim 1, further comprising a fluoropolymer, polysulphone, polyether sulphone, polyphenylene sulphone, polybenzimidazole, polyphenylene sulphide, semiaromatic polyamide, liquid-crystalline polymer, polyimide, polyetherimide or mixtures thereof.

* * * * *